United States Patent
Jeong et al.

(10) Patent No.: US 8,379,616 B2
(45) Date of Patent: Feb. 19, 2013

(54) BIT CALCULATION METHOD AND APPARATUS FOR PDSCH TRANSMISSION

(75) Inventors: Chan Bok Jeong, Daejeon (KR); Dae Ho Kim, Daejeon (KR); Yeong Jin Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 791 days.

(21) Appl. No.: 12/542,814

(22) Filed: Aug. 18, 2009

(65) Prior Publication Data

US 2010/0159939 A1   Jun. 24, 2010

(30) Foreign Application Priority Data

Dec. 18, 2008 (KR) .................. 10-2008-0129633

(51) Int. Cl.
*H04J 1/00* (2006.01)
(52) U.S. Cl. ......... 370/343; 370/252; 370/329; 455/450
(58) Field of Classification Search .............. None
See application file for complete search history.

(56) References Cited

U.S. PATENT DOCUMENTS

| | | |
|---|---|---|
| 2005/0105502 A1 | 5/2005 | Kim et al. |
| 2006/0146749 A1 | 7/2006 | Lundh et al. |
| 2007/0041458 A1 | 2/2007 | Hocevar et al. |
| 2008/0220792 A1 | 9/2008 | Fischer |
| 2009/0003486 A1* | 1/2009 | Kwon et al. .................. 375/299 |
| 2009/0219868 A1* | 9/2009 | Lee et al. .................... 370/329 |
| 2010/0157913 A1* | 6/2010 | Nagata et al. ................ 370/329 |

FOREIGN PATENT DOCUMENTS

| | | |
|---|---|---|
| KR | 10-0548346 | 2/2006 |
| KR | 1020070095905 | 10/2007 |
| KR | 1020080065558 | 7/2008 |
| KR | 10-0994318 | 11/2010 |

* cited by examiner

*Primary Examiner* — Jason Mattis
*Assistant Examiner* — James P Duffy
(74) *Attorney, Agent, or Firm* — Nelson Mullins Riley & Scarborough LLP; EuiHoon Lee, Esq.

(57) ABSTRACT

Provided is a bit calculation method, which accurately and easily calculates how many bits are transmitted by codeword per PDSCH in advance before a modulator performs modulation by TTI unit on a PCH or a DL-SCH transferred by a TrCH encoder, in a base-station modulator applied to an LTE-advanced system. Accordingly, the bit calculation method enables smooth data transmission, and easily checks data transmission error.

17 Claims, 5 Drawing Sheets

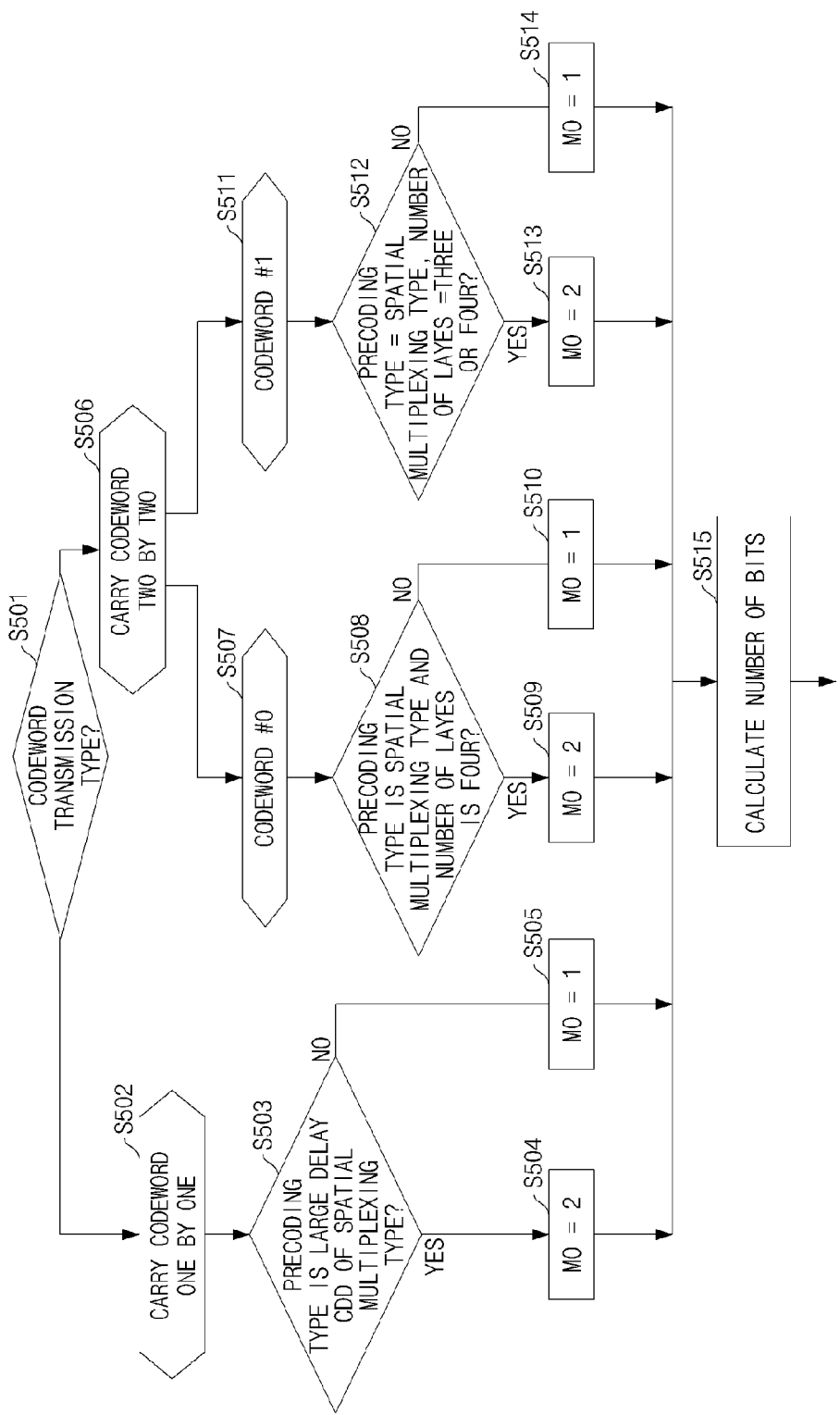

BIT CALCULATION METHOD AND APPARATUS FOR PDSCH TRANSMISSION

CROSS-REFERENCE TO RELATED APPLICATIONS

This application claims priority under 35 U.S.C. §119 to Korean Patent Application No. 10-2008-0129633. filed on Dec. 18, 2008 in the Korean Intellectual Property Office, the disclosure of which is incorporated herein by reference in its entirety.

TECHNICAL FIELD

The following disclosure relates to a bit calculation of transmission data, and in particular, to a bit calculation method and apparatus, which calculates beforehand how many bits are transmitted by codeword per Physical Downlink Shared Channel (PDSCH) before a modulator performs modulation by Transmission Time Interval (TTI) unit on a Physical Channel (PCH) or a Downlink Shared Channel (DL-SCH) transferred by a TrCH encoder, in a base-station modulator applied to an LTE-advanced system.

BACKGROUND

A TrCH encoder of a base station encodes a PCH or a DL-SCH to transfer it to a modulator. The modulator performs transmission using a PDSCH on two channels from among a plurality of downlink transport channels.

In reference to "3GPP TR 25.814 v7.1.0—Version September, 2006" for the implementation of an LTE-Advanced system, a resource allocation scheme between the PDSCH and other physical channels is not clearly defined.

Accordingly, a node B scheduler allocating a resource to the PDSCH allocates the resource to the PDSCH as a localized type or a distributed type. If other transmitted physical channels are allocated to the allocated resource, the PDSCH uses an overwrite type through an occupied physical channel.

Based on such a method, for the PCH or the DL-SCH transferred by the TrCH encoder, a method (where the modulator calculates beforehand how many bits are transmitted by codeword per PDSCH before performing modulation by TTI unit and enables safe transmission of the bits through the channel) is satisfied by multiplying a resource block (which is allocated by codeword per PDSCH) by an Orthogonal Frequency Division Multiplexing (OFDM) symbol which is transmitted during 1 TTI.

In this way, the number of bits to transmit is easily obtained, but if a control channel occupies a resource to which the PCSCH is allocated, loss of a PDSCH signal is inevitable.

In LTE standard "3GPP TS 36.211 v8.4.0—Version August, 2008", which is one of the standards that are referred to as the basis for the development of a current LTE-Advanced system, a resource allocation scheme between the PDSCH and other transmitted physical channels has been clearly defined.

For the PCH or the DL-SCH transferred by the TrCH encoder of the base station, calculation (on how many bits the modulator transmits by codeword per the PDSCH by TTI unit) is necessarily performed in an L1 controller or the node B scheduler that is the upper layer of the modulator, and thus, the PCH or the DL-SCH is not only used in the upper layer but is also transferred to the TrCH encoder and the modulator. Accordingly, downlink transmission is smoothly performed.

However, while a Cell-Specific Reference Signal (CSRS), Primary Synchronization Signal (PSS), Secondary Synchronization Signal (SSS) and Physical Broadcast Channel (PBCH) are allocated to a region to which a resource for the PDSCH is allocated, or PDSCH resource allocation is performed as the localized type or the distributed type due to factors such as a precoding type, because the number of layers, a modulation type, a transmitted antenna set and the number of codewords transmitted to a user terminal, the number of the bits of the PCH or DL-SCH which is actually transmitted by transmitted OFDM symbol varies.

Accordingly, for the PCH or the DL-SCH transferred by the TrCH encoder, the modulator has difficulty in calculating in advance how many bits it transmits by codeword per PDSCH before performing modulation by TTI unit, and it is difficult to check the number of transmission bits beforehand in the L1 controller or the node B scheduler that is the upper layer of the modulator.

SUMMARY

In one general aspect, a bit calculation apparatus includes: a resource allocation unit allocating a resource, on a downlink data channel; a channel analysis unit searching channel use circumstances to check a usable resource, on the resource required by the resource allocation unit; a subcarrier analysis unit checking a plurality of usable subcarriers, on the usable resource; and a bit calculation unit calculating the number of transmission bits per codeword transmitted through the downlink data channel according to the usable subcarriers and a modulation type of a modulator.

The resource allocation unit may include: a resource allocation type analyzer searching a plurality of resource blocks required according to a resource allocation type; and a resource block compiler compiling the resource blocks searched by the resource allocation type analyzer.

The resource allocation type analyzer may include: a first resource allocation type analyzer searching resource blocks by using a 25-bit bitmap; a second resource allocation type analyzer searching the resource blocks by using a 22-bit bitmap, a 2-bit subset indicator and a 1-bit span indicator; and a third resource allocation type analyzer searching the resource blocks by using a resource indication value.

The channel analysis unit may include: a subframe transmission analyzer searching a plurality of OFDM symbols used for channel transmission to check a plurality of usable resource blocks by subframe; and a usable resource block compiler compiling the usable resource blocks by the subframe.

The subframe transmission analyzer may search a first resource block which is always used to transmit a first sync signal, a second sync signal and a broadcasting channel, and a second resource block which is always used to transmit the first sync signal and the second sync signal, to calculate the usable resource block.

The subcarrier analysis unit may include: a subcarrier calculator calculating the number of the usable subcarriers of a usable resource block per OFDM symbol by antenna set; and a subcarrier compiler compiling the number of the usable subcarriers of the resource block.

The subcarrier calculator may include a transmission antenna set detector. When the transmission antenna set detected by the transmission antenna set detector is a first transmission path (Tx 1paths), the subcarrier calculator may exclude the two subcarriers of the subcarriers of the each resource block from the usable subcarriers on three OFDM symbols. When the transmission antenna set detected by the transmission antenna set detector is a second transmission path (Tx 2paths), the subcarrier calculator may exclude the four subcarriers of the subcarriers of the each resource block from the usable subcarriers on three OFDM symbols. When the transmission antenna set detected by the transmission antenna set detector is a fourth transmission path (Tx 4paths), the subcarrier calculator may exclude the four subcarriers of the subcarriers of the each resource block from the usable subcarriers on five OFDM symbols. Accordingly, the subcarrier calculator may calculate the number of the usable subcarriers.

The bit calculation unit may include: a multiplication offset calculator calculating a multiplication offset according to a precoding type, a modulation type and the number of codewords carried in the each subcarrier; and a bit operator calculating the number of the transmission bits per codeword with the multiplication offset, the total number of the usable subcarriers and the number of transmission bits based on a modulation type.

In a case where the codeword is carried one by one, the multiplication offset calculator may calculate 1 as a multiplication offset value when the precoding type is an open-loop spatial multiplexing type or a closed-loop spatial multiplexing type, and may calculate 2 as the multiplication offset value when the precoding type is not the open-loop spatial multiplexing type or the closed-loop spatial multiplexing type. In a case where the codeword is carried two by two, the multiplication offset calculator may calculate 2 as the multiplication offset value when the precoding type is a spatial multiplexing type and the number of layers is four, and may calculate 1 as the multiplication offset value when the precoding type is not the spatial multiplexing type or the number of the layers is not four, on the first codeword. In the case where the codeword is carried two by two, the multiplication offset calculator may calculate 2 as the multiplication offset value when the precoding type is the spatial multiplexing type and the number of the layers is three or four, and may calculate 1 as the multiplication offset value when the precoding type is not the spatial multiplexing type or the number of the layers is not three or four, on the second codeword.

In another general aspect, a bit calculation apparatus includes: a resource allocation unit allocating a resource, on a downlink data channel; a channel analysis unit searching channel use circumstances to check a usable resource, on the resource required by the resource allocation unit; a subcarrier analysis unit checking a plurality of usable subcarriers, on the usable resource; and a bit calculation unit calculating the number of transmission bits per codeword carried in the usable subcarrier through the downlink data channel. Herein, the resource allocation unit includes: a resource allocation type analyzer searching a plurality of resource blocks required according to a resource allocation type; and a resource block compiler compiling the resource blocks searched by the resource allocation type analyzer. The channel analysis unit includes: a subframe transmission analyzer searching a plurality of Orthogonal Frequency Division Multiplexing (OFDM) symbols used for channel transmission to check a plurality of usable resource blocks by subframe; and a usable resource block compiler compiling the usable resource blocks by the subframe. The subcarrier analysis unit includes: a subcarrier calculator calculating the number of the usable subcarriers of the usable resource block per OFDM symbol by antenna set; and a subcarrier compiler compiling the number of the usable subcarriers of the resource block. The bit calculation unit includes: a multiplication offset calculator calculating a multiplication offset according to a precoding type, a modulation type and the number of codewords carried in the each subcarrier; and a bit operator calculating the number of transmission bits per codeword with the multiplication offset, the total number of the usable subcarriers and the number of transmission bits based on a modulation type.

In another general aspect, a bit calculation method includes: allocating a resource, on a downlink data channel; searching channel use circumstances to check a usable resource, on the resource required by the resource allocation unit; checking a plurality of usable subcarriers, on the usable resource; and calculating the number of transmission bits per codeword transmitted through the downlink data channel according to the usable subcarriers and the modulation type of a modulator.

The allocating of the resource may include searching a plurality of resource blocks required according to a resource allocation type; and compiling the searched resource blocks.

The resource allocation type may include: a first resource allocation type for allocating the resource blocks by using a 25-bit bitmap; a second resource allocation type for allocating the resource blocks by using a 22-bit bitmap, a 2-bit subset indicator and a 1-bit span indicator; and a third resource allocation type for allocating the resource blocks by using a resource indication value.

The checking of the usable resource may include: searching a plurality of OFDM symbols used for channel transmission to check a plurality of usable resource blocks by subframe; and compiling the usable resource blocks by the subframe.

The checking of the usable resource blocks by subframe may include: searching a first resource block which is always used to transmit a first sync signal, a second sync signal and a broadcasting channel and a second resource block which is always used to transmit the first sync signal and the second sync signal, among the resource blocks of the OFDM symbols used for channel transmission; and determining the resource block except the first and second resource blocks as the usable resource block, among the resource blocks of the OFDM symbols.

The checking of the usable resource may include: calculating the number of the usable subcarriers of a resource block per OFDM symbol by antenna set; and compiling the number of the calculated usable subcarriers.

The calculating of the number of the usable subcarriers may include: detecting a transmission antenna set; excluding the two subcarriers of the subcarriers of the each resource block from the usable subcarrier on three OFDM symbols, when the transmission antenna set is a first transmission path (Tx 1paths); excluding the four subcarriers of the subcarriers of the each resource block from the usable subcarrier on three OFDM symbols, when the transmission antenna set is a second transmission path (Tx 2paths); excluding the four subcarriers of the subcarriers of the each resource block from the usable subcarrier on five OFDM symbols, when the transmission antenna set is a fourth transmission path (Tx 4paths); and calculating the number of the usable subcarriers.

The calculating of the number of the transmission bits per codeword may include: calculating a multiplication offset according to a precoding type, a modulation type and the number of codewords carried in the each subcarrier; and calculating the number of the transmission bits per codeword with the calculated multiplication offset, the total number of the usable subcarriers and the number of transmission bits based on a modulation type.

The calculating of the multiplication offset may include: calculating 1 as a multiplication offset value when the precoding type is an open-loop spatial multiplexing type or a closed-loop spatial multiplexing type, and calculating 2 as the multiplication offset value when the precoding type is not the open-loop spatial multiplexing type or the closed-loop spatial multiplexing type, in a case where the codeword is carried one by one. The calculating of the multiplication offset may include: calculating 2 as the multiplication offset value when the precoding type is a spatial multiplexing type and the number of layers is four, and calculating 1 as the multiplication offset value when the precoding type is not the spatial multiplexing type or the number of the layers is not four, on the first codeword, in a case where the codeword is carried two by two. The calculating of the multiplication offset may include: calculating 2 as the multiplication offset value when the precoding type is the spatial multiplexing type and the number of the layers is three or four, and calculating 1 as the multiplication offset value when the precoding type is not the spatial multiplexing type or the number of the layers is not three or four, on the second codeword, in the case where the codeword is carried two by two.

Other features and aspects will be apparent from the following detailed description, the drawings, and the claims.

BRIEF DESCRIPTION OF THE DRAWINGS

FIG. 5 is a flowchart schematically illustrating a method of calculating the number of bits per codeword transmitted through the PDSCH in a bit calculation unit according to an exemplary embodiment.

DETAILED DESCRIPTION OF EMBODIMENTS

Figure 1:
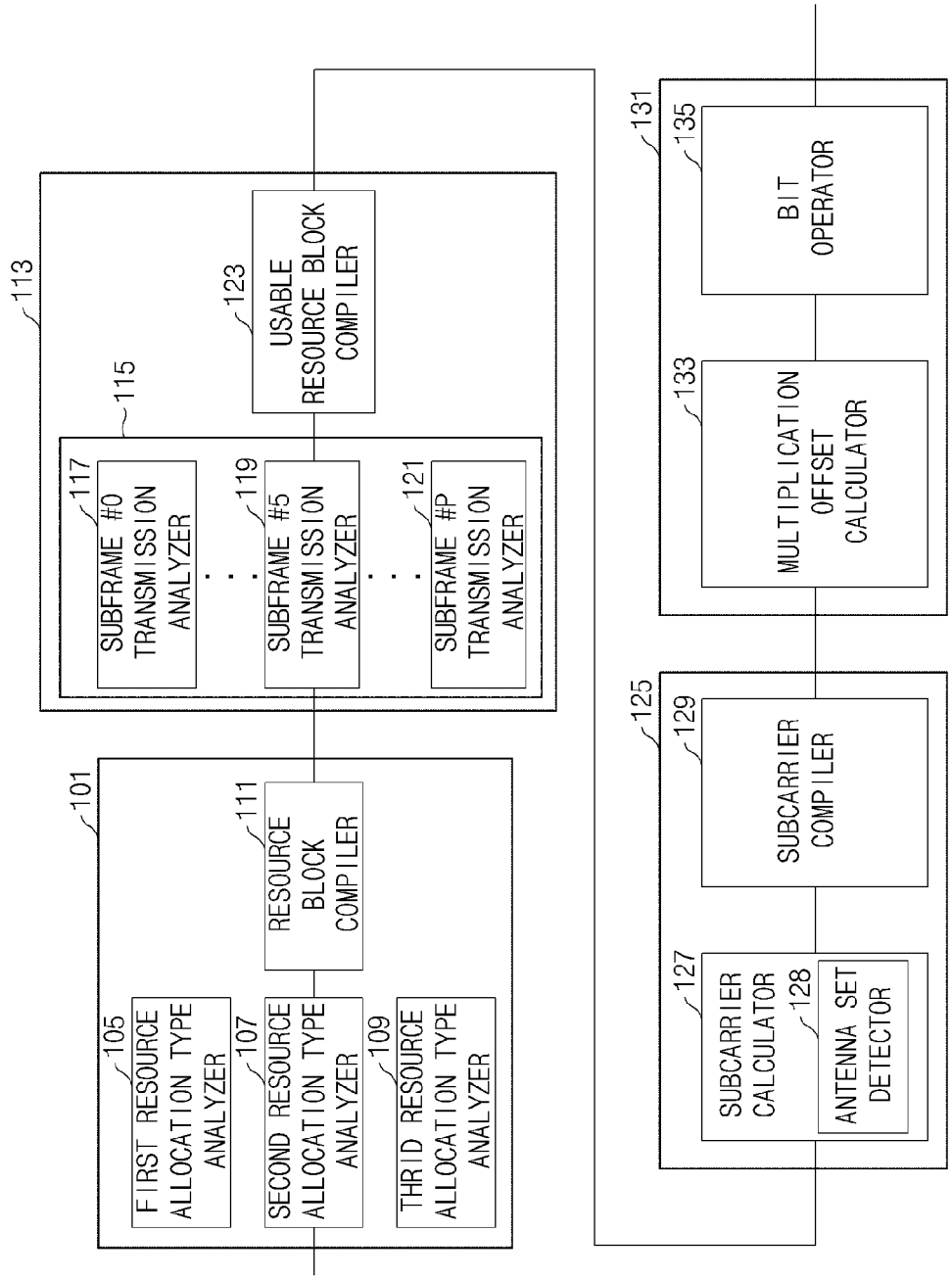
FIG. 1 is a block diagram schematically illustrating a transmission bit calculation apparatus for calculating the total number of bits which a modulator transmits by codeword per PDSCH during 1 TTI in a normal CP type according to an exemplary embodiment.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/of systems described herein will be suggested to those of ordinary skill in the art. Also, descriptions of well-known functions and constructions may be omitted for increased clarity and conciseness.

Exemplary embodiments relate to a method which calculates beforehand how many bits are transmitted by codeword per PDSCH by TTI before a modulator performs modulation, on a PCH or a DL-SCH through which a TrCH encoder transfers data.

1 TTI is composed of OFDM symbol 0 to OFDM symbol 13, and a section transmitted through the PDSCH is from the OFDM symbol 3 to the OFDM symbol 13. The each OFDM symbol has the resource block of 0 to 99, and the each resource block is composed of twelve subcarriers.

FIG. 1 is a block diagram schematically illustrating a transmission bit calculation apparatus for calculating the total number of bits which a modulator transmits by codeword per PDSCH during 1 TTI in a normal CP type according to an exemplary embodiment.

The transmission bit calculation apparatus according to an exemplary embodiment is divided into four devices. The transmission bit calculation apparatus according to an exemplary embodiment includes a resource allocation unit 101, a channel analysis unit 113, a subcarrier analysis unit 125, and a bit calculation unit 131. Herein, the resource allocation unit 101 is based on a resource allocation type for a PDSCH transmitted through a modulation process on a PCH or a DL-SCH. The channel analysis unit 113 determines whether a PSS, an SSS and a PBCH are used for a required resource allocation. The subcarrier analysis unit 125 analyzes whether to use subcarriers by OFDM symbol by a CSRS based on a transmitted antenna set. The bit calculation unit 131 calculates the total number of bits according to the number of transmitted codewords, a precoding type and a modulation type.

The resource allocation unit 101, which analyzes a resource block that is required for a resource by resource allocation type for the PDSCH transmitted through the modulation process on the PCH or the DL-SCH, includes a first resource allocation type analyzer 105, a second resource allocation analyzer 107, a third resource allocation type analyzer 109, and a resource block compiler 111 compiling resource blocks required for resource allocation.

The channel analysis unit 113, which analyzes whether the PSS, the SSS and the PBCH are used for a required resource allocation, includes a subframe transmission analyzer 115. The subframe transmission analyzer 115 analyzes whether to transmit the PSS, the SSS and the PBCH on the each resource block to which the resource allocation unit 101 requires analysis, and analyzes whether the resource block required by the channel analysis unit 101 is used according to a result of the analysis.

The subframe transmission analyzer 115 includes a subframe #0 transmission analyzer 117, ..., a subframe #5 transmission analyzer 119, ..., and a subframe #P transmission analyzer 121, with the point when a transmission is performed through the PDSCH on the P+1 number of subframes.

The channel analysis unit 113 includes a usable resource block compiler 123 compiling resource blocks which are determined to be usable among required resource blocks.

The subcarrier analysis unit 125, which analyzes whether to use the subcarriers by OFDM symbol by the CSRS based on the transmitted antenna set, includes a subcarrier calculator 127 and a subcarrier compiler 129. The subcarrier calculator 127 calculates the number of the usable subcarriers of a usable resource block per OFDM symbol by antenna set. The subcarrier compiler 129 compiles the number of the subcarriers which are determined to be usable. The subcarrier calculator 127 includes a transmission antenna set detector 128 detecting a transmission antenna set.

The bit calculation unit 131 (which is based on the number of modulated codewords transmitted through the PDSCH, a precoding type and a modulation type) includes a multiplication offset calculator 133 and a bit operator 135. The multiplication offset calculator 133 calculates a multiplication offset according to the number of the codewords transmitted to the respective subcarriers, the precoding type and the modulation type. The bit operator 135 calculates the number of transmission bits per codeword with the number of transmission bits based on the multiplication offset, the total number of usable subcarriers and the modulation type.

Figure 2:
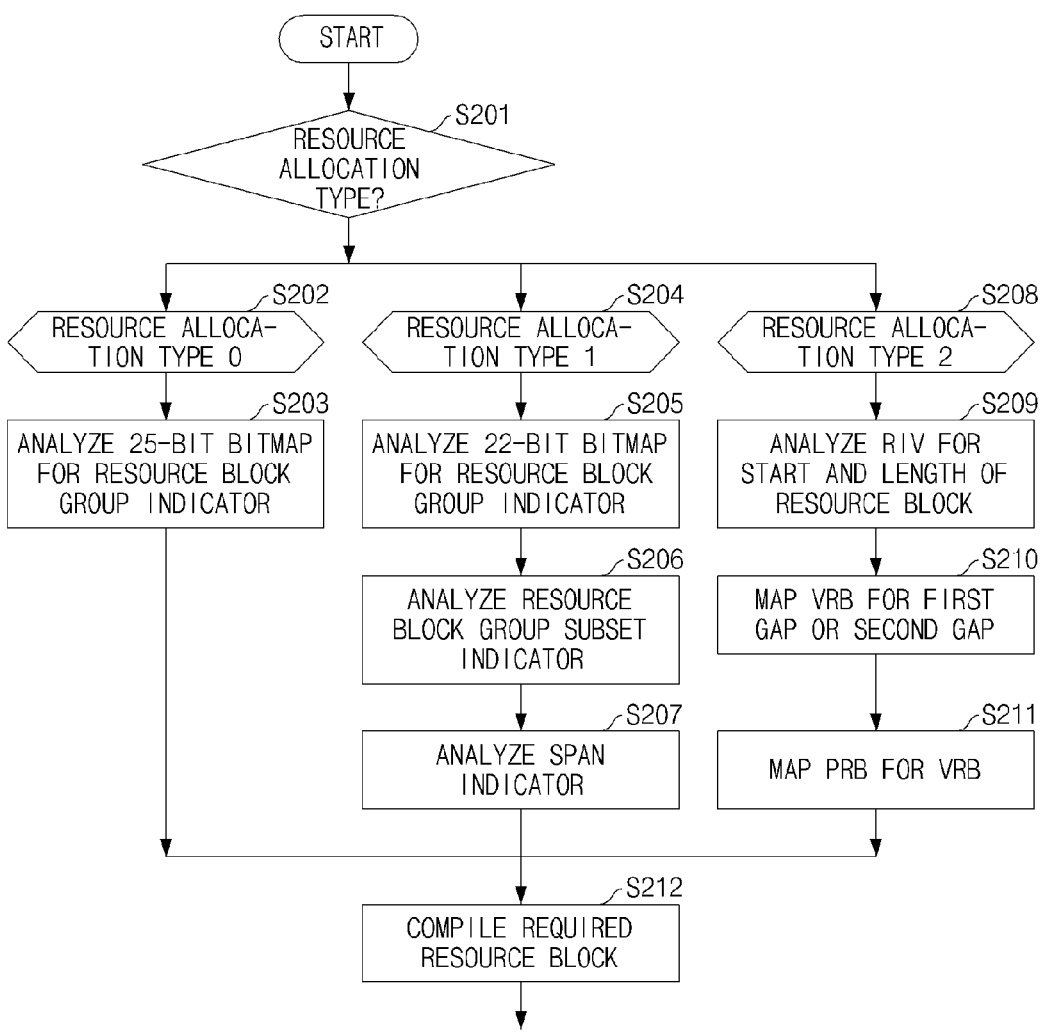
FIG. 2 is a flowchart schematically illustrating a method of compiling necessary resource blocks in a resource allocation unit according to an exemplary embodiment.

FIG. 2 is a flowchart schematically illustrating a method of compiling necessary resource blocks in the resource allocation unit 101 according to an exemplary embodiment.

The resource allocation unit 101 preferentially checks what the resource allocation type is in operation S201.

When the resource allocation type is a resource allocation type 0 in operation S202, the first resource allocation type analyzer 105 finds a resource block corresponding to a resource block group represented in a 25-bit bitmap in operation S203.

When the resource allocation type is a resource allocation type 1 in operation S204, the second resource allocation type analyzer 107 finds a resource block necessary for resource allocation by using a 22-bit bitmap, a 2-bit subset indicator and a 1-bit span indicator in operations S205 to S207.

When the resource allocation type is a resource allocation type 2 in operation S208, the third resource allocation type analyzer 109 calculates the length of a resource block which is continuously disposed with an initial resource block by using a Resource Indication Value (RIV) in operation S209.

Resource allocation is performed in a localized type or a distributed type. In a case of the distributed type, the resource allocation unit 101 obtains a Virtual Resource Block (VRB) by a first gap or a second gap in operation S210, and thereafter maps the VRBs with Physical Resource Blocks (PRBs) to find a required resource block in operation S211. Even in a case of the localized type, the resource allocation unit 101 maps the VRBs and the PRBs into the same resource block to find a required resource block in operation S211.

In this way, each operation has been performed according to the used resource allocation types, and thereafter the resource block compiler 111 compiles the resource blocks required for resource allocation in operation S212.

The channel analysis unit 113 determines whether the required each resource block allocates the PDSCH or not, with time and frequency where the each resource block is disposed.

Figure 3:
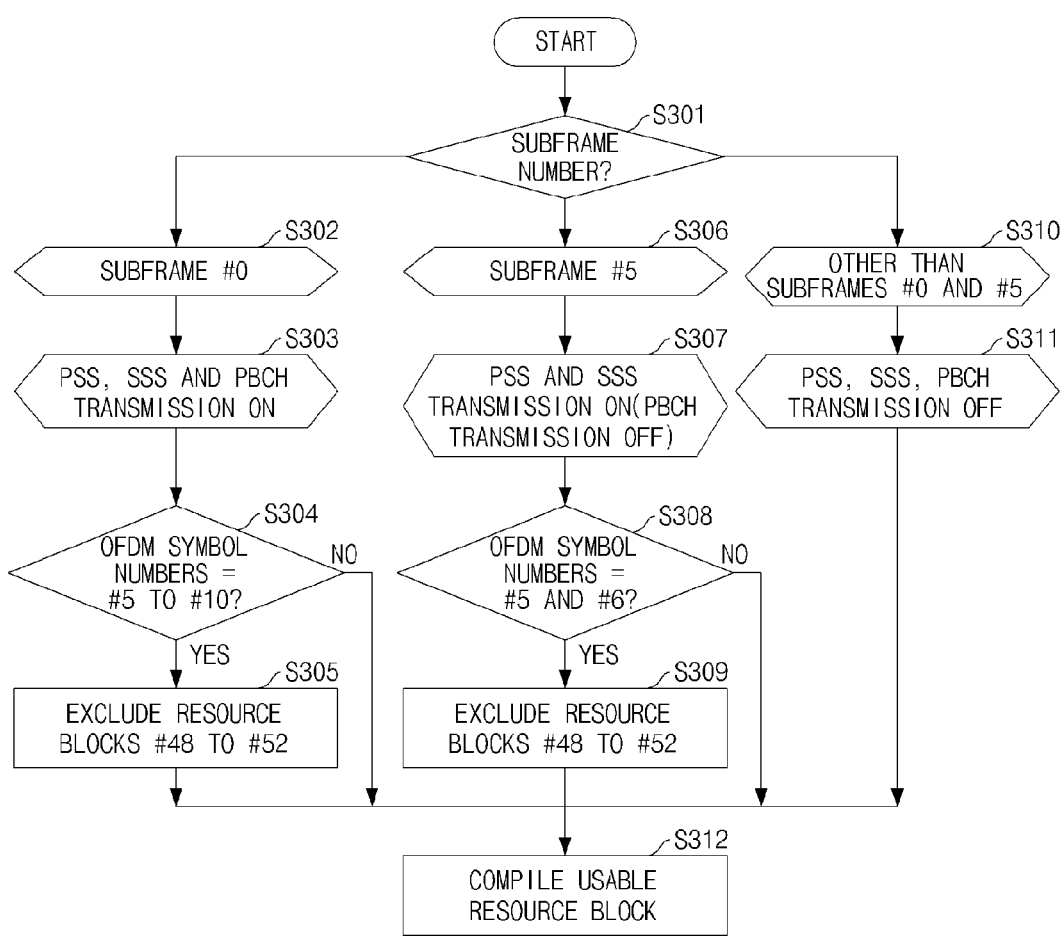
FIG. 3 is a flowchart schematically illustrating a method of checking usable resources in a channel analysis unit according to an exemplary embodiment.

FIG. 3 is a flowchart schematically illustrating a method of checking usable resources in the channel analysis unit 113 according to an exemplary embodiment.

Referring to FIG. 3, the channel analysis unit 113 receives the compiled result of the resource requirements from the resource allocation unit 101, and checks a subframe number through the subframe transmission analyzer 115 in operation S301.

When the checked subframe number is 0 in operation S302, the subframe #0 transmission analyzer 117 analyzes usable resource blocks. The subframe #0 is the point when the PSS, the SSS and the PBCH are always transmitted, and thus, a resource block (corresponding to the positions of #48 to #52 among the resource blocks which is required in a section of the OFDM symbol #5 to OFDM symbol #10 of the OFDM symbols constituting the subframes) cannot be used for the transmission of the PDSCH because it is used for the transmission of the PSS, the SSS and the PBCH. Accordingly, the resource block is excluded from the usable resource blocks.

When the checked subframe number is 5 in operation S306, the subframe #5 transmission analyzer 119 analyzes the usable resource blocks. The subframe #5 is the point when PSS and SSS channels are always transmitted and the PBCH is never transmitted, and thus, a resource block (corresponding to the positions of #48 to #52 among the resource blocks which is required in a section of the OFDM symbol #5 and OFDM symbol #6 of the OFDM symbols constituting the subframes) cannot be used for the transmission of the PDSCH because it is used for the transmission of the PSS and SSS channels. Accordingly, the resource block is excluded from the usable resource blocks.

When subframes other than the subframes #0 to #5 in operation S310, because a point is the point when the PSS, the SSS and the PBCH are never transmitted in operation S311, all the required resource blocks are used for the transmission of the PDSCH.

In this way, each operation has been performed with the point when the PDSCH is transmitted, and thereafter the usable resource block compiler 123 compiles the resource blocks which are checked as the usable resource block among the required resource blocks in operation S312.

The subcarrier analysis unit 125 checks whether to enable the use of all the twelve subcarriers constituting the each resource block on each of the compiled usable resource blocks.

Figure 4:
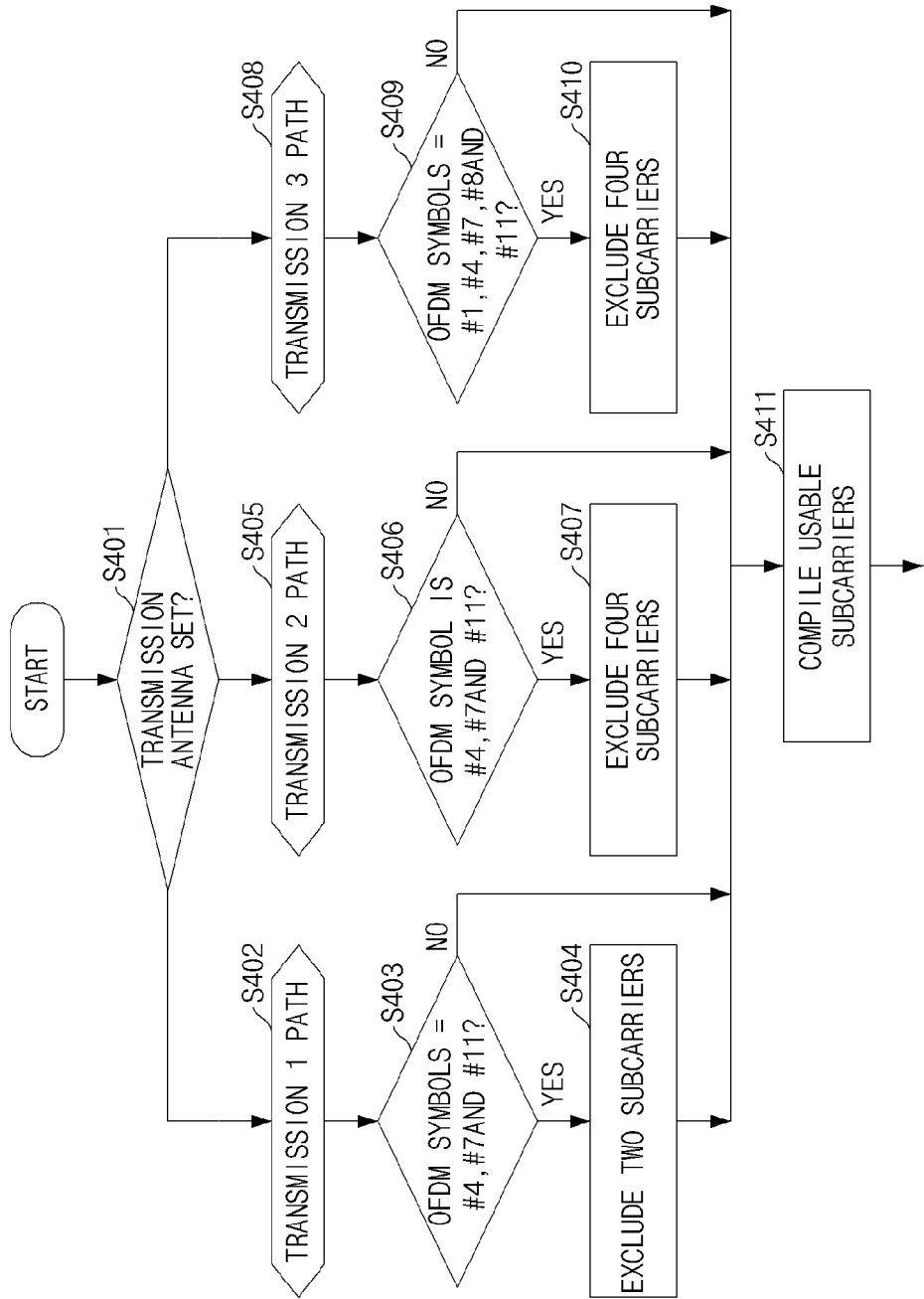
FIG. 4 is a flowchart schematically illustrating a method of checking usable subcarriers in a subcarrier analysis unit according to an exemplary embodiment.

FIG. 4 is a flowchart schematically illustrating a method of checking usable subcarriers in the subcarrier analysis unit 125 according to an exemplary embodiment.

Referring to FIG. 4, the subcarrier analysis unit 125 first determines a transmission antenna set through the transmission antenna set detector 128 in operation S401.

The subcarriers occupied by the CSRS are changed according to the transmission antenna set. Accordingly, the subcarrier analysis unit 125 preferentially analyzes the transmission antenna set for determining whether to enable the use of all the twelve subcarriers constituting the each resource block, on the compiled usable resource blocks for PDSCH resource allocation.

When the transmission antenna set is a first transmission path (Tx 1path) in operation S402, the subcarrier analysis unit 125 determines whether a point is the point for the OFDM symbol #4, the OFDM symbol #7 and the OFDM symbol #11 in operation S403. When the OFDM symbol #4, the OFDM symbol #7 and the OFDM symbol #11, the two subcarriers of the twelve subcarriers constituting the each resource block on the each usable resource block cannot be used because of being used for CSRS transmission in operation S404. In this case, the subcarrier analysis unit 125 uses all the twelve subcarriers constituting the each resource block on the OFDM symbol where other PDSCH is transmitted.

When the transmission antenna set is a second transmission path (Tx 2paths) in operation S405, the subcarrier analysis unit 125 determines whether a point is the point for the OFDM symbol #4, the OFDM symbol #7 and the OFDM symbol #11 in operation S406. When the OFDM symbol #4, the OFDM symbol #7 and the OFDM symbol #11, the four subcarriers of the twelve subcarriers constituting the each resource block on the each usable resource block cannot be used because of being used for CSRS transmission in operation S407. In this case, the subcarrier analysis unit 125 uses all the twelve subcarriers constituting the each resource block on the OFDM symbol where other PDSCH is transmitted.

When the transmission antenna set is a third transmission path (Tx 3paths) in operation S408, the subcarrier analysis unit 125 determines whether a point is the point for the OFDM symbol #1, the OFDM symbol #4, the OFDM symbol #7, the OFDM symbol #8 and the OFDM symbol #11 in operation S409. When the OFDM symbol #1, the OFDM symbol #4, the OFDM symbol #7, the OFDM symbol #8 and the OFDM symbol #11, the four subcarriers of the twelve subcarriers constituting the each resource block on the each usable resource block cannot be used because of being used for CSRS transmission in operation S410. In this case, the subcarrier analysis unit 125 uses all the twelve subcarriers constituting the each resource block on the OFDM symbol where other PDSCH is transmitted.

In this way, each operation has been performed according to the transmitted antenna set, and thereafter the subcarrier compiler 129 compiles the usable subcarriers on the usable resource blocks in operation S411.

The bit calculation unit 131 calculates the number of bits which are transmitted though the usable subcarriers.

FIG. 5 is a flowchart schematically illustrating a method of calculating the number of bits per codeword transmitted through the PDSCH in the bit calculation unit 131 according to an exemplary embodiment.

The bit calculation unit 131 calculates the total number of bits which the modulator transmits by codeword per PDSCH by TTI unit according to whether one codeword or two codewords are carried in the compiled each subcarrier at a time and what the modulation type and the precoding type by PDSCH are.

First, the bit calculation unit 131 determines whether one codeword or two codewords are carried in the compiled each subcarrier at a time in operation S501.

When one codeword is carried through the PDSCH at a time in operation S502, i.e., when the PDSCH is considering carrying the codeword one by one, the multiplication offset calculator 133 calculates a Multiplication Offset (MO) according to the modulation type. When the bit calculation unit 135 calculates the total number of bits, the multiplication offset is necessary.

The multiplication offset calculator 133 determines whether the precoding type is the large delay CDD of an open-loop spatial multiplexing type or a closed-loop spatial multiplexing type in operation S503. When the large delay CDD of an open-loop spatial multiplexing type or a closed-loop spatial multiplexing type, the multiplication offset calculator 133 calculates 2 as a multiplication offset value in operation S504. In cases other than this, the multiplication offset calculator 133 calculates 2 as a multiplication offset value in operation S505.

When two codewords are carried through the PDSCH at a time in operation S506, i.e., when the PDSCH is considering carrying the codeword two by two, the multiplication offset calculator 133 calculates the multiplication offset value in different types on the codeword (which is carried two by two), i.e., codeword #0 and codeword #1.

When the first codeword (the codeword #0) of the two codewords in operation S507, the multiplication offset calculator 133 determines whether the precoding type is a spatial multiplexing type and the number of layers is four in operation S508.

When the determination result shows that the precoding type is the spatial multiplexing type and the number of the layers is four, the multiplication offset calculator 133 calculates 2 as the multiplication offset value in operation S509. In cases other than this, the multiplication offset calculator 133 calculates 1 as the multiplication offset value in operation S510.

When the second codeword (the codeword #1) of the two codewords in operation S511, the multiplication offset calculator 133 determines whether the precoding type is the spatial multiplexing type and the number of the layers is three or four in operation S512.

When the determination result shows that the precoding type is the spatial multiplexing type and the number of the layers is three or four, the multiplication offset calculator 133 calculates 2 as the multiplication offset value in operation S513. In cases other than this, the multiplication offset calculator 133 calculates 1 as the multiplication offset value in operation S514.

The bit calculation unit 135 multiplies the calculated multiplication offset value by the number of the usable subcarriers of the usable resource block of the resource blocks required for resource allocation and the number of transmission bits (2 in the case of QPSK, 4 in the case of 16QAM, and 6 in the case of 64QAM) based on the modulation type, to thereby calculate the total number of bits which the modulator transmits by codeword per PDSCH of TTI unit on the PCH or the DL-SCH in operation S515.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A bit calculation apparatus, comprising:
   a resource allocation unit allocating a resource, on a downlink data channel;
   a channel analysis unit analyzing channel use circumstances to check a usable resource, on the resource required by the resource allocation unit;
   a subcarrier analysis unit checking a plurality of usable subcarriers, on the usable resource; and
   a bit calculation unit calculating the number of transmission bits per codeword transmitted through the downlink data channel according to the usable subcarriers and a modulation type of a modulator,
   wherein the subcarrier analysis unit comprises:
   a subcarrier calculator; and
   a subcarrier compiler,
   wherein the subcarrier calculator calculates the number of the usable subcarriers of a usable resource block per Orthogonal Frequency Division Multiplexing (OFDM) symbol by antenna set, and the subcarrier compiler compiles the number of the usable subcarriers of the resource block.

2. The bit calculation apparatus of claim 1, wherein the resource allocation unit comprises:
   a resource allocation type analyzer; and
   a resource block compiler,
   wherein the resource allocation type analyzer analyzes a plurality of resource blocks required according to a resource allocation type, and the resource block compiler compiles the resource blocks analyzed by the resource allocation type analyzer.

3. The bit calculation apparatus of claim 2, wherein the resource allocation type analyzer comprises:
   a first resource allocation type analyzer analyzing the resource blocks by using a 25-bit bitmap;
   a second resource allocation type analyzer analyzing the resource blocks by using a 22-bit bitmap, a 2-bit subset indicator and a 1-bit span indicator; and
   a third resource allocation type analyzer analyzing the resource blocks by using a resource indication value.

4. The bit calculation apparatus of claim 1, wherein the channel analysis unit comprises:
   a subframe transmission analyzer; and
   a usable resource block compiler,
   wherein the subframe transmission analyzer analyzing a plurality of Orthogonal Frequency Division Multiplexing (OFDM) symbols used for channel transmission to check a plurality of usable resource blocks by subframe, and the usable resource block compiler compiles the usable resource blocks by the subframe.

5. The bit calculation apparatus of claim 4, wherein when checking the usable resource blocks by subframe, the subframe transmission analyzer analyzes a first resource block which is always used to transmit a first sync signal, a second sync signal and a broadcasting channel, and a second resource block which is always used to transmit the first sync signal and the second sync signal, to calculate the usable resource block.

6. The bit calculation apparatus of claim 1, wherein the subcarrier calculator comprises a transmission antenna set detector,
wherein the subcarrier calculator excludes two subcarriers of the subcarriers of the each resource block from the usable subcarriers on three OFDM symbols when the transmission antenna set detected by the transmission antenna set detector is a first transmission path (Tx 1paths), excludes four subcarriers of the subcarriers of the each resource block from the usable subcarriers on three OFDM symbols when the transmission antenna set detected by the transmission antenna set detector is a second transmission path (Tx 2paths), and excludes the four subcarriers of the subcarriers of the each resource block from the usable subcarriers on five OFDM symbols when the transmission antenna set detected by the transmission antenna set detector is a fourth transmission path (Tx 4paths), to calculate the number of the usable subcarriers.

7. The bit calculation apparatus of claim 1, wherein the bit calculation unit comprises:
a multiplication offset calculator; and
a bit operator,
wherein the multiplication offset calculator calculates a multiplication offset according to a precoding type, a modulation type and the number of codewords carried in the each subcarrier, and the bit operator calculates the number of the transmission bits per codeword with the multiplication offset, the total number of the usable subcarriers and the number of transmission bits based on a modulation type.

8. The bit calculation apparatus of claim 7, wherein:
in a case where the codeword is carried one by one, the multiplication offset calculator calculates 1 as a multiplication offset value when the precoding type is an open-loop spatial multiplexing type or a closed-loop spatial multiplexing type, and calculates 2 as the multiplication offset value when the precoding type is not the open-loop spatial multiplexing type or the closed-loop spatial multiplexing type,
in a case where the codeword is carried two by two, the multiplication offset calculator calculates 2 as the multiplication offset value when the precoding type is a spatial multiplexing type and the number of layers is four, and calculates 1 as the multiplication offset value when the precoding type is not the spatial multiplexing type or the number of the layers is not four, on the first codeword, and
in the case where the codeword is carried two by two, the multiplication offset calculator calculates 2 as the multiplication offset value when the precoding type is the spatial multiplexing type and the number of the layers is three or four, and calculates 1 as the multiplication offset value when the precoding type is not the spatial multiplexing type or the number of the layers is not three or four, on the second codeword.

9. A bit calculation apparatus, comprising:
a resource allocation unit allocating a resource, on a downlink data channel;
a channel analysis unit analyzing channel use circumstances to check a usable resource, on the resource required by the resource allocation unit;
a subcarrier analysis unit checking a plurality of usable subcarriers, on the usable resource; and
a bit calculation unit calculating the number of transmission bits per codeword carried in the usable subcarrier through the downlink data channel,
wherein:
the resource allocation unit comprises:
a resource allocation type analyzer analyzing a plurality of resource blocks required according to a resource allocation type; and
a resource block compiler compiling the resource blocks analyzed by the resource allocation type analyzer,
the channel analysis unit comprises:
a subframe transmission analyzer analyzing a plurality of Orthogonal Frequency Division Multiplexing (OFDM) symbols used for channel transmission to check a plurality of usable resource blocks by subframe; and
a usable resource block compiler compiling the usable resource blocks by the subframe,
the subcarrier analysis unit comprises:
a subcarrier calculator calculating the number of the usable subcarriers of the usable resource block per OFDM symbol by antenna set; and
a subcarrier compiler compiling the number of the usable subcarriers of the resource block, and
the bit calculation unit comprises:
a multiplication offset calculator calculating a multiplication offset according to a precoding type, a modulation type and the number of codewords carried in the each subcarrier; and
a bit operator calculating the number of transmission bits per codeword with the multiplication offset, the total number of the usable subcarriers and the number of transmission bits based on a modulation type.

10. A bit calculation method, comprising:
allocating a resource, on a downlink data channel;
analyzing channel use circumstances to check a usable resource, on the resource required by the resource allocation unit;
checking a plurality of usable subcarriers, on the usable resource; and
calculating the number of transmission bits per codeword transmitted through the downlink data channel according to the usable subcarriers and a modulation type of a modulator,
wherein the checking of a usable resource comprises:
calculating the number of the usable subcarriers of a resource block per Orthogonal Frequency Division Multiplexing (OFDM) symbol by antenna set; and
compiling the number of the calculated usable subcarriers.

11. The bit calculation method of claim 10, wherein the allocating of a resource comprises:
analyzing a plurality of resource blocks required according to a resource allocation type; and
compiling the analyzed resource blocks.

12. The bit calculation method of claim 11, wherein the resource allocation type comprises:
   a first resource allocation type for allocating the resource blocks by using a 25-bit bitmap;
   a second resource allocation type for allocating the resource blocks by using a 22-bit bitmap, a 2-bit subset indicator and a 1-bit span indicator; and
   a third resource allocation type for allocating the resource blocks by using a resource indication value.

13. The bit calculation method of claim 10, wherein the checking of a usable resource comprises:
   analyzing a plurality of Orthogonal Frequency Division Multiplexing (OFDM) symbols used for channel transmission to check a plurality of usable resource blocks by subframe; and
   compiling the usable resource blocks by the subframe.

14. The bit calculation method of claim 13, wherein the checking of a plurality of usable resource blocks by subframe comprises:
   analyzing a first resource block which is always used to transmit a first sync signal, a second sync signal and a broadcasting channel and a second resource block which is always used to transmit the first sync signal and the second sync signal, among the resource blocks of the OFDM symbols used for channel transmission; and
   determining the resource block except the first and second resource blocks as the usable resource block, among the resource blocks of the OFDM symbols.

15. The bit calculation method of claim 10, wherein the calculating of the number of the usable subcarriers comprises:
   detecting a transmission antenna set;
   excluding two subcarriers of the subcarriers of the each resource block from the usable subcarrier on three OFDM symbols, when the transmission antenna set is a first transmission path (Tx 1paths);
   excluding four subcarriers of the subcarriers of the each resource block from the usable subcarrier on three OFDM symbols, when the transmission antenna set is a second transmission path (Tx 2paths);
   excluding the four subcarriers of the subcarriers of the each resource block from the usable subcarrier on five OFDM symbols, when the transmission antenna set is a fourth transmission path (Tx 4paths); and
   calculating the number of the usable subcarriers.

16. The bit calculation method of claim 10, wherein the calculating of the number of the transmission bits per codeword comprises:
   calculating a multiplication offset according to a precoding type, a modulation type and the number of codewords carried in the each subcarrier; and
   calculating the number of the transmission bits per codeword with the calculated multiplication offset, the total number of the usable subcarriers and the number of transmission bits based on a modulation type.

17. The bit calculation method of claim 16, wherein the calculating of a multiplication offset comprises:
   calculating 1 as a multiplication offset value when the precoding type is an open-loop spatial multiplexing type or a closed-loop spatial multiplexing type, and calculating 2 as the multiplication offset value when the precoding type is not the open-loop spatial multiplexing type or the closed-loop spatial multiplexing type, in a case where the codeword is carried one by one;
   calculating 2 as the multiplication offset value when the precoding type is a spatial multiplexing type and the number of layers is four, and calculating 1 as the multiplication offset value when the precoding type is not the spatial multiplexing type or the number of the layers is not four, on the first codeword, in a case where the codeword is carried two by two; and
   calculating 2 as the multiplication offset value when the precoding type is the spatial multiplexing type and the number of the layers is three or four, and calculating 1 as the multiplication offset value when the precoding type is not the spatial multiplexing type or the number of the layers is not three or four, on the second codeword, in the case where the codeword is carried two by two.

* * * * *